(12) United States Patent
Gunnarsson

(10) Patent No.: US 8,787,824 B2
(45) Date of Patent: Jul. 22, 2014

(54) SYSTEM AND METHOD FOR DETERMINING REPEATER GAIN

(75) Inventor: Fredrik Gunnarsson, Linköping (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 314 days.

(21) Appl. No.: 13/238,597

(22) Filed: Sep. 21, 2011

(65) Prior Publication Data
US 2013/0072111 A1  Mar. 21, 2013

(51) Int. Cl.
*H04B 7/14* (2006.01)

(52) U.S. Cl.
USPC ............... 455/7; 455/9; 455/11.1; 455/13.1; 455/15

(58) Field of Classification Search
USPC ............ 455/7, 9, 11.1, 13.1, 41.1, 41.2, 501, 455/5.4, 513, 522, 69, 63.4, 67.13, 67.16, 455/575.5, 115.1, 115.3, 121, 135, 138, 455/144, 161.3, 194.2, 219, 245.1, 15; 370/315, 311; 375/213, 130
See application file for complete search history.

(56) References Cited

U.S. PATENT DOCUMENTS

| | | | |
|---|---|---|---|
| 5,115,514 A | 5/1992 | Leslie | |
| 5,835,848 A * | 11/1998 | Bi et al. | 455/24 |
| 2002/0044594 A1 * | 4/2002 | Bongfeldt | 375/213 |
| 2004/0042345 A1 * | 3/2004 | Kawaguchi | 368/47 |
| 2004/0166802 A1 * | 8/2004 | McKay et al. | 455/15 |
| 2007/0280333 A1 * | 12/2007 | Abou Rjeily | 375/130 |
| 2009/0268642 A1 * | 10/2009 | Knox | 370/277 |
| 2012/0182906 A1 * | 7/2012 | Knox | 370/278 |
| 2013/0044662 A1 * | 2/2013 | Kwon et al. | 370/311 |
| 2013/0250847 A1 * | 9/2013 | Lee et al. | 370/315 |

OTHER PUBLICATIONS

U.S. Appl. No. 13/238,509, filed Sep. 21, 2011, Fredrik Gunnarsson.
U.S. Appl. No. 13/238,769, filed Sep. 21, 2011, Fredrik Gunnarsson.
3GPP, 3rd Generation Partnership Project; Technical Specification Group Core Network and Terminals: Non-Access-Stratum (NAS) Protocol for Evolved Packet System (EPS), Stage 3 (Release 10). 3GPP TS 24.301 V10.3.0 (Jun. 2011).
3GPP, 3rd Generation Partnership Project; Technical Specification Group Radio Access Network; Radio Resource Control (RRC); Protocol Specificaiton (Release 10). 3GPP TS 25.231 V10.4.0.
3GPP, 3rd Generation Partnership Project; Technical Specification Group Radio Access Network; UTRAN Function, Examples on Signalling Procedures (Release 10). 3GPP TR 25.931 V10.1.0.

* cited by examiner

*Primary Examiner* — Tan Trinh

(57) ABSTRACT

A method for operating a repeater in a wireless communication network includes transmitting a predetermined sequence of bits over a first antenna of a repeater and measuring an attenuation in the transmitted bits as received at a second antenna of the repeater. The method also includes determining a power value for the repeater based on the attenuation. Additionally, the method includes receiving information at a first power level from one of a mobile terminal and a base station and determining, based at least in part on the power value, a second power level at which to transmit the received information. Furthermore, the method includes transmitting the received information at the second power level.

14 Claims, 7 Drawing Sheets

SYSTEM AND METHOD FOR DETERMINING REPEATER GAIN

TECHNICAL FIELD OF THE INVENTION

This disclosure relates in general to wireless communication and, more particularly, to a repeater for facilitating communication between a mobile terminal and a radio access network.

BACKGROUND OF THE INVENTION

A goal of mobile broadband aims is to offer seamless wireless communications services essentially everywhere. Macro cell deployments often provide acceptable service coverage, while some areas such as important and/or very populated buildings are subject to dedicated solutions. However, in some other areas, macro coverage is insufficient, and it is not economically viable to consider dedicated deployments. Examples include underground garages, tunnels, and apartment buildings.

One appealing solution in such cases is to deploy repeaters. A repeater receives radio signals at one antenna and forwards the received signal over another, possibly after some amplification. Repeaters (amplifies and) forwards both the signals and noise, which may have a negative impact on the donor cell. All received signals at the pick-up antenna are repeated—no knowledge about the communication protocols is needed. Furthermore, the donor cell and base station may be unaware that the link is via a repeater.

However, repeated signals transmitted by a repeater from one antenna may interfere with signals received by that repeater for repeating at its other antenna. Furthermore, if the gain level of the repeater is set too high, the repeater may cause instability in the overall network. Therefore, the configuration of signal gain and other operating parameters of a particular repeater can significantly impact the effectiveness of that repeater, as well as that of mobile communication system overall. Nonetheless, the optimal configuration of a particular repeater may depend on the characteristics of its operational environment, including certain characteristics that may change with time. Thus, optimal configuration of repeaters may depend on measurements made after repeaters have been installed and are operational. However, manually obtaining such measurements and configuring repeaters after installation may be time-consuming, difficult, and expensive.

SUMMARY OF THE INVENTION

In accordance with the present disclosure, certain disadvantages and problems associated with mobile communication have been substantially reduced or eliminated. In particular, certain devices and techniques for repeating wireless transmissions are described.

In accordance with a particular embodiment of the present disclosure, a method for operating a repeater in a wireless communication network includes transmitting a predetermined sequence of bits over a first antenna of a repeater and measuring an attenuation in the transmitted bits as received at a second antenna of the repeater. The method also includes determining a power value for the repeater based on the attenuation. Additionally, the method includes receiving information at a first power level from one of a mobile terminal and a base station and determining, based at least in part on the power value, a second power level at which to transmit the received information. Furthermore, the method includes transmitting the received information at the second power level.

In accordance with another embodiment of the present invention, an apparatus for repeating signals in a wireless communication network includes a first antenna, a second antenna, a transmitter, a receiver, and a processor. The transmitter receives transmit signals on the first antenna and the receiver operable to receive signals through the second antenna. The processor is capable of transmitting a sequence of bits over the first antenna using the transmitter and measuring an attenuation in the transmitted bits as received at the second antenna. The processor is also capable of determining a power value based on the attenuation and receiving information at a first power level from one of a mobile terminal and a base station. Additionally, the processor is capable of determining, based at least in part on the power value, a second power level at which to transmit the received information and transmitting the received information at the second power level.

Important technical advantages of certain embodiments of the present invention include techniques for configuring an advanced repeater based on the interaction between the repeater's antennas. Particular embodiments may be capable of establishing a transmission power, a gain level, or another aspect of the repeater's power characteristics based on the amount of impact one or more antennas will have on the others. Additionally, particular embodiments of the repeater may be capable of configuring themselves independently, while others may be configured to interact with other components to permit centralized management of the repeater's configuration. As a result, certain embodiments provide a repeater that is more easily and cheaply installed and configured. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
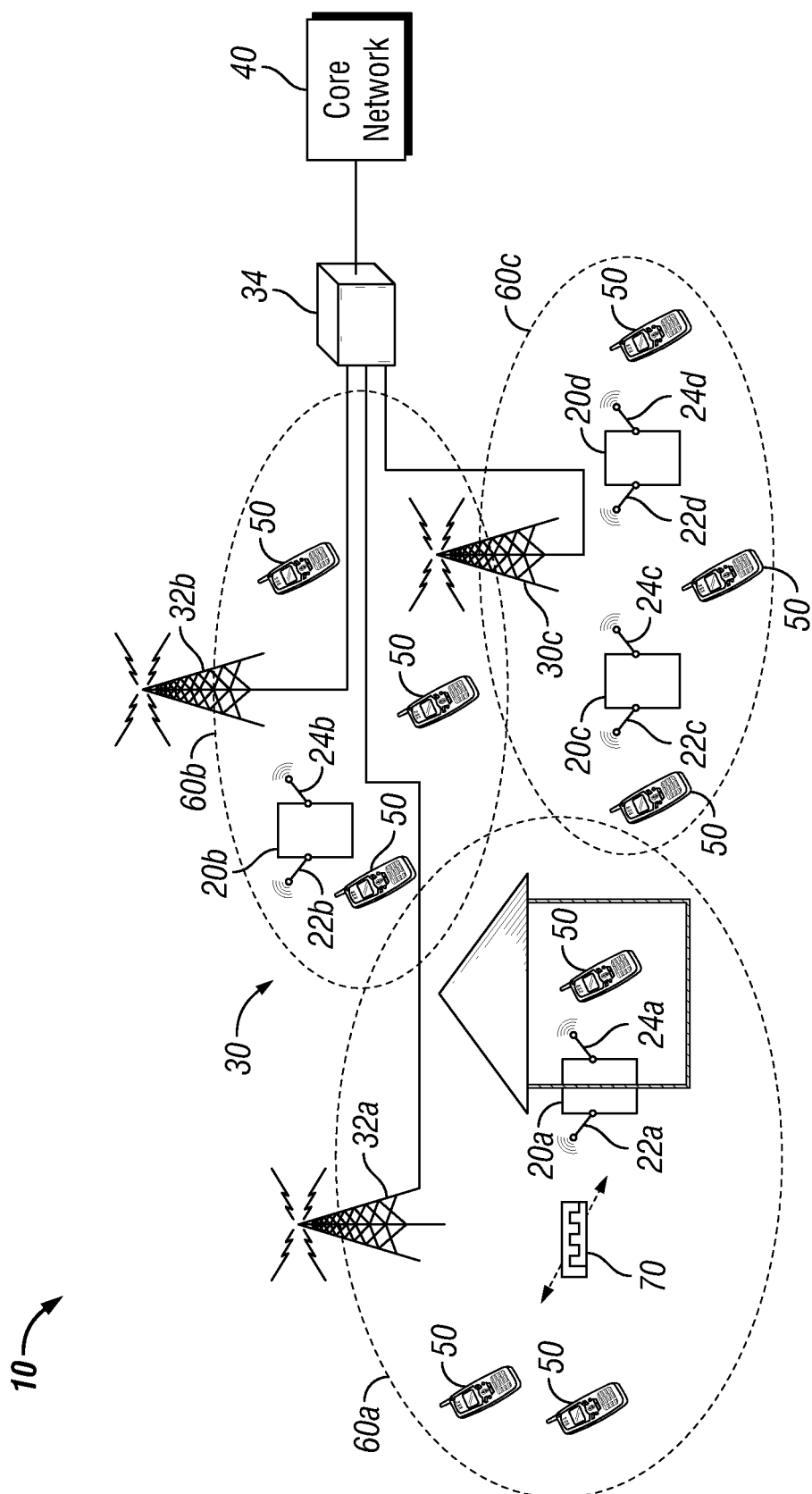
FIG. 1 illustrates a mobile communication system that includes a repeater capable of repeating transmissions received from mobile devices and/or an access network of the mobile communication system.

FIG. 1 illustrates a mobile communication system 10 that provides communication service to a plurality of mobile devices 50. Mobile communication system 10 includes an access network 30 that provides communication services to a plurality of cells 60 associated with mobile communication system 10 and a core network 40 that provides backhaul delivery of information within mobile communication system 10. To increase the coverage and/or capacity of access network 30, mobile communication system 10 also contains one or more repeaters 20 that repeat radiofrequency signals received from mobile devices 50.

If not properly configured, repeaters 20 may interfere with signals transmitted by mobile devices 50 and access network 30, including the signals they themselves receive. However, optimal configuration of repeaters 20 may depend on operational parameters that cannot be determined until a repeater 20 is installed and functional, making manual configuration time-consuming and labor intensive if mobile communication system 10 includes numerous repeaters 20. Thus, to simplify configuration and facilitate ongoing re-configuration, particular embodiments of repeater 20 provide an effective solution for automated configuration of repeaters 20, as described in further detail below.

In general, mobile communication system 10 provides mobile communication service to mobile devices 50 operating within a geographic area associated with mobile communication system 10. Mobile communication system 10 is capable of communicating information between a mobile device 50 and other mobile devices 50 and/or between a mobile device 50 and other communication devices, such as landline telephones connected to mobile communication system 10. Mobile communication system 10 may support the communication of any suitable type of information and/or in accordance with any appropriate communication standards. For example, mobile communication system 10 may represent a Global System for Mobile Communications (GSM) network, a Wideband Code Division Multiple Access (WCDMA) network, an Long Term Evolution (LTE) communication network, or a network configured to communicate in accordance with any other suitable standard.

Repeaters 20 receive and forward information transmitted wirelessly between mobile devices 50 and access network 30. Repeaters 20 each include two or more antennas, and signals received on one antenna of a repeater 20 are repeated on the other antenna. Repeaters 20 amplify received signals based on gains that may be configured for repeaters 20 before or during operation. In particular embodiments, repeaters 20 repeat information transmitted by access network 30 and mobile devices 50, as well as received noise, without decoding the received signals.

Repeaters 20 may represent any appropriate combination of hardware and/or software suitable to provide the described functionality. The contents of an example embodiment of repeater 20 are illustrated in greater below with respect to FIG. 3. In particular embodiments, repeaters 20 may include a terminal module, or otherwise support certain mobile terminal functionality, permitting repeaters 20 to communicate with access network 30 in a similar or identical fashion to that with which mobile devices 50 communicate with access network 30. For example, in particular embodiments, repeaters 20 can establish a signaling connection to an appropriate node of access network 30 (e.g., a radio control node) via Radio Resource Control (RRC) signaling in a similar manner to mobile devices 50.

Access network 30 communicates wirelessly with mobile devices 50 and serves as an interface between mobile devices 50 and core network 40. Access network 30 may represent or include any elements responsible for radio transmissions or for control of radio connections with mobile devices 50. Access network 30 may represent or include a radio access network and/or any elements responsible for providing a radio or air interface for core network 40. For example, in the illustrated embodiment, access network 30 represents a WCDMA access network 30 that includes base stations 32 and radio controllers 34.

Base stations 32 communicate wirelessly with mobile devices 50 to support mobile communication for mobile devices 50. Base stations 32 may include any appropriate elements to communicate with mobile devices 50 and to interface mobile devices 50 with core network 40. For example, depending on the communications standards supported by access network 30 and core network 40, each base station 32 may represent or include a conventional base station, a Node B, an evolved Node B (eNode B), a radio base station (RBS), or any other suitable element capable of communicating with mobile devices 50 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller (BSC), a radio network controller (RNC), or any other suitable collection of hardware and/or software appropriate for controlling base stations 32. Depending on the configuration of a particular embodiment of mobile communication system 10, radio controllers 34 may be omitted from mobile communication system 10, or radio controllers 34 may represent components integrated with or functionality provided by based stations 32.

Core network 40 routes voice and/or data communicated by mobile devices 50 from access network 30 to other mobile devices 50 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in particular embodiments of mobile communication system 10, core network 40 may represent a Mobile Application Part (MAP) core network. Additionally, core network 40 may also be responsible for aggregating communication for longhaul transmission, authenticating users, manage user mobility, providing call control, billing, or other functionality associated with providing communication services to mobile devices 50.

Mobile devices 50 provide voice, data, and/or multimedia communication service for users via wireless connections with mobile communication system 10. Mobile devices 50 may represent any appropriate devices capable of wireless communications including, but not limited to, cellular telephones, portable digital assistants (PDAs), laptop or tablet computers, and network-enabled media players. In embodiments of mobile communication system 10 that support 3rd Generation (3G) communication technologies, mobile devices 50 may each represent user equipment (UE).

In operation, mobile communication system 10 provides telecommunication service to mobile devices 50. As part of this service, access network 30 communicates wirelessly with mobile devices 50. For example, in the illustrated embodiment, base stations 32 of access network 30 establish wireless connections with mobile devices 50 for communication over radiofrequency (RF) channels, and radio controllers 34 govern use of available RF channels, manage mobility of mobile devices 50, and otherwise control operation of base stations 32. Meanwhile, core network 40 transports voice, data, multimedia, and/or other types of information between various components of access network 30 and between other elements of mobile communication system 10, such as wireline communication devices.

In order to increase coverage and/or throughput of access network 30, certain cells 60 of mobile communication system 10 also include one or more repeaters 20. Repeaters 20 forward transmissions received from mobile devices 50 to appropriate elements of access network 30 (e.g., base stations 32 in the illustrated embodiment). Repeaters 20 may also be configured to amplify repeated signals to further increase their signal strength as received at their intended destination. Unfortunately, repeaters 20 may cause mobile devices 50 to contribute to the overall signal received by base stations 32 at higher levels than desired, potentially jeopardizing the stability of mobile communication system 10 or reducing the service quality of other connections to the relevant base stations 32. Furthermore, repeated signals transmitted by a repeater 20 from one antenna may interfere with signals received by that repeater 20 for repeating at its other antenna.

Therefore, the configuration of signal gain and other operating parameters of a particular repeater 20 can significantly impact the effectiveness of that repeater 20, as well as that of mobile communication system 10 overall. Nonetheless, the optimal configuration of a particular repeater 20 may depend on the characteristics of its operational environment, including certain characteristics that may change with time. Thus, optimal configuration of repeaters 20 may depend on measurements made after repeaters 20 have been installed and are operational. However, manually obtaining such measurements and configuring repeaters 20 after installation may be time-consuming, difficult, and expensive.

Thus, to facilitate configuration, repeaters 20 may measure certain operational or environmental parameters once functional, and repeaters 20 or other components of mobile communication system 10 may then configure repeaters 20 based on those measurements. For example, in particular embodiments, repeaters 20 may be installed in or on buildings (such as repeater 20a in the illustrated example) so that a first antenna 22a (referred to for the purposes of this example as "outdoor antenna 22a") of that repeater 20 is located building while a second antenna 24a (referred to for the purposes of this example as "indoor antenna 24a") of the relevant repeater 20 is located inside the building. As a result, in the illustrated embodiment, repeater 20a can repeat, on outdoor antenna 22a, signals that were transmitted by mobile devices 50 operating within the building and received on indoor antenna 24a. Because the mobile devices 50 may themselves have limited transmission power, or may be constrained by regulatory or standardized power limits, signals transmitted by mobile devices 50 may be undetectable or unidentifiable outside the walls of the building by base stations 32. Thus, by repeating signals received inside the building on the indoor antenna 24a, repeater 20a may enable base stations 32 to detect and correctly decode signals transmitted by the indoor mobile devices 50.

However, if the repeated signals transmitted by outdoor antenna 22a are received strongly enough at indoor antenna 24a, the repeated signals can overwhelm other signals received at indoor antenna 24a from mobile devices 50 inside the building. Therefore, to facilitate configuration, repeater 20a estimates the interaction between the two antennas. More specifically, repeater 20a measures the isolation of one antenna with respect to another. One technique for estimating this isolation is to emit a test signal 70 comprising a predetermined sequence of bits at a known power level from outdoor antenna 22a and measure the received energy of test signal 70 as received at indoor antenna 24a.

To permit this measurement, repeater 20 may correlate signals received on indoor antenna 24a with the known test signal 70 transmitted by outdoor antenna 22a. If the correlation between the signal received at indoor antenna 24a and the predetermined sequence of bits in test signal 70 is sufficiently high, repeater 20 will determine that the signal received at indoor antenna 24a during the relevant period of time represents test signal 70 as received by indoor antenna 24a. Repeater 20a may then determine the signal strength of the received signal during that time period and compare the signal strength of the received test signal 70 with the transmission power at which test signal 70 was originally transmitted. Based on this comparison, repeater 20a may determine an isolation value for indoor antenna 24a with respect to outdoor antenna 22a. In particular embodiments, repeater 20 may use timing information associated with the transmission of test signal 70 from outdoor antenna 22a, such as a scheduled transmission time for test signal 70, to limit the time window over which repeater 20 performs the correlation.

Test signal 70 may represent any suitable sequence of bits repeater 20 is capable of transmitting. However, because repeaters 20 may be designed to operate in licensed frequency bands, repeater 20a may not be permitted to arbitrarily transmit test signals 70 in public without violating telecommunications regulations. Thus, particular embodiments of repeater 20 may utilize, for test signal 70, signals that repeater 20 would otherwise be required or permitted to transmit during operation. For example, as noted above, particular embodiments of repeater 20 include mobile terminal functionality. In such embodiments, repeater 20 may utilize signals that repeater 20 would otherwise transmit as part of establishing a radio link connection with a donor base station 32 (e.g., base station 32a in the illustrated embodiment) indistinguishable or similar to those established by mobile devices 50.

As one example of such signals, repeater 20a may utilize signaling transmitted during a random access by repeater 20a as test signal 70. In particular, repeater 20a may utilize a random access signature that repeater 20a incorporate in a random access channel transmission as test signal 70. Accordingly, repeater 20a may select, from a set of available signatures, a random access signature for use in the random access transmission and transmit the random access signature as part of the random access transmission over outdoor antenna 22a. Simultaneously with or soon after making the random access transmission, repeater 20a will begin attempting to correlate the signal received on indoor antenna 24a with the selected random access signature.

As another example, repeater 20a may perform the estimation after repeater 20a has obtained an RRC Connection Setup message from base station 32a. In particular, repeater 20a may utilize, as test signal 70, an assigned uplink scrambling code. Repeater 20a transmits this scrambling code as part of an RRC Connection Setup Complete message sent to donor base station 32a in response to an RRC Connection Setup message received from base station 32a. Accordingly, repeater 20a may transmit an RRC Connection Setup Complete message, and simultaneous with or soon after transmitting the message, begin attempting to correlate the signal received on indoor antenna 24a with the assigned uplink scrambling code.

Repeater 20a may measure the isolation at any appropriate time during operation. In various embodiments, repeater 20a may measure the isolation once at start up, periodically on a predetermined schedule, or on an event-driven basis. For example, as described above, repeater 20a may be configured to measure isolation in conjunction with certain mandatory signaling performed by repeater 20a, such as random access transmissions or RRC connection signaling.

After repeater 20a has measured the isolation of one antenna with respect to the other, repeater 20a configures itself based on the measured isolation. As part of configuring itself based on the measure isolation, repeater 20a may transmit information indicating the isolation to other elements of mobile communication system 10 and may receive configuration parameters from the relevant element in response. For example, in particular embodiments, repeater 20a transmits information indicating the isolation to a node in access network 30 (referred to here generically as a "radio network node"), such as a base station 32 or a radio controller 34. Depending on the particular embodiment involved, repeater 20a may transmit this information to the radio network node whenever repeater 20a measures the isolation, when the isolation change exceeds some threshold, on a scheduled basis, or at any other appropriate time.

Repeater 20a, a radio network node, or any other appropriate element of mobile communication system 10 may then determine an appropriate configuration for repeater 20a. For example, in particular embodiments, repeater 20a uses the isolation to determine a power value indicating a power level repeater 20a should use to transmit repeated signals. The power value may indicate in any suitable manner, directly or indirectly, the power level to be used for transmitting repeated signals. For example, the power value may reflect a repeater gain ($G_R$) by which repeater 20a should amplify repeated signals, a maximum repeater gain ($G_{max}$) below which repeater 20a should set repeater gain $G_R$, a transmission power ($P_{tx}$) that repeater 20a should use when transmitting repeated signals, or any other indication of the appropriate power level.

Furthermore, the relevant component of mobile communication system 10 may use the isolation and any other relevant values, considerations, or factors in any suitable manner to determine the power value. As one specific example, in particular embodiments, repeater 20a utilizes a maximum interference power level ($I_{ant}$) that defines a maximum level for the interference received by one of the antennas from the other antenna or a maximum level for the interference that can be received by either antenna from the other. In such embodiments, repeater 20a may determine a power value reflecting the transmission power ($P_{tx}$) for repeater 20a to use in re-transmitting signals as a function of the estimated isolation $G_i$ and this predetermined maximum interference power $I_{ant}$ (e.g., in linear scale so that $P_{tx} \leq I_{ant}/G_i$).

As another specific example, in particular embodiments, repeater 20a utilizes a maximum roundtrip gain level ($G_{total}$) that defines a maximum amount of gain that can be induced in a signal as the signal is received at antenna 24a, amplified by repeater 20a, transmitted by the other antenna 22a, and then received at the original antenna 24a again. In such embodiments, repeater 20a may determine a power value reflecting a gain level for repeater 20a ($G_R$) as a function of the estimated isolation $G_i$ and this predetermined maximum roundtrip gain level $G_{total}$ (e.g., in linear scale so that $G_R \leq G_{total}/G_i$). In certain embodiments, $G_{total}$ may be set equal to 1. As a result, in such embodiments, a signal received by antenna 24a, amplified by repeater 20a, and transmitted by the other antenna 22a will not experience a net gain when the amplified signal is received by the original antenna 24a and propagated through repeater 20a again. Setting $G_R$ in this manner may prevent repeater 20a from causing instability in mobile communication system 10.

As yet another specific example, in particular embodiments, repeater 20a utilizes a predetermined maximum interference ($I_{BS}$) that defines a maximum amount of interference that may be introduced at the serving base station by signals transmitted by repeater 20a, as well as an estimated uplink attenuation ($G_{BS}$) that estimates the attenuation a signal transmitted by repeater 20a experiences in propagating between repeater 20a and base station 32. In such embodiments, repeater 20a may determine a power value reflecting a gain level for repeater 20a ($G_R$) based on the estimated uplink attenuation $G_{BS}$, the predetermined maximum interference $I_{BS}$, and a power level ($P_{mob}$) used by mobile devices 50 for transmissions. For example, repeater 20a may set $G_R$, such that $G_R \leq (I_{BS}/P_{mob}) - G_{BS}$. Furthermore, in particular embodiments, repeater 20a may utilize $G_i$ in conjunction with multiple different parameters such as $G_{BS}$ and $P_{mob}$ to calculate multiple different potential gain levels ($G_R$) and select a power value based on the lowest of these gain levels.

In particular embodiments of mobile communication system 10, repeater 20a may be installed under circumstances such that the isolation between antennas 22a and 24a may not be symmetric and it may be necessary to estimate the isolation between antennas 22a and 24a in both directions. In such embodiments, repeater 20a may use the process described above to estimate the isolation ($G_{I1}$) in one direction, and then repeat the process described above, reversing the roles of the two antennas, to determine the isolation ($G_{I2}$) in the opposite direction. Alternatively, after estimating the isolation in the first direction, repeater 20a may assume the isolation in the opposite direction is approximately equal to the isolation in the first direction or estimate the isolation in the second direction according to some predetermined formula without directly measuring the isolation in the second direction.

Figure 2A:
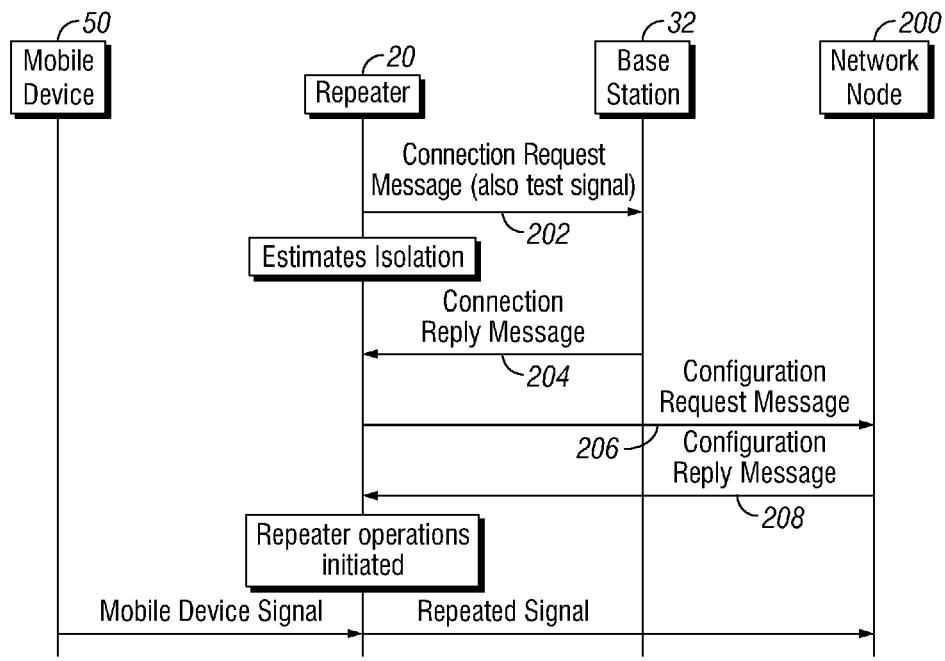
FIGS. 2A and 2B are signaling diagrams showing example interaction between elements of the mobile communication system shown by FIG. 1
Figure 2B:
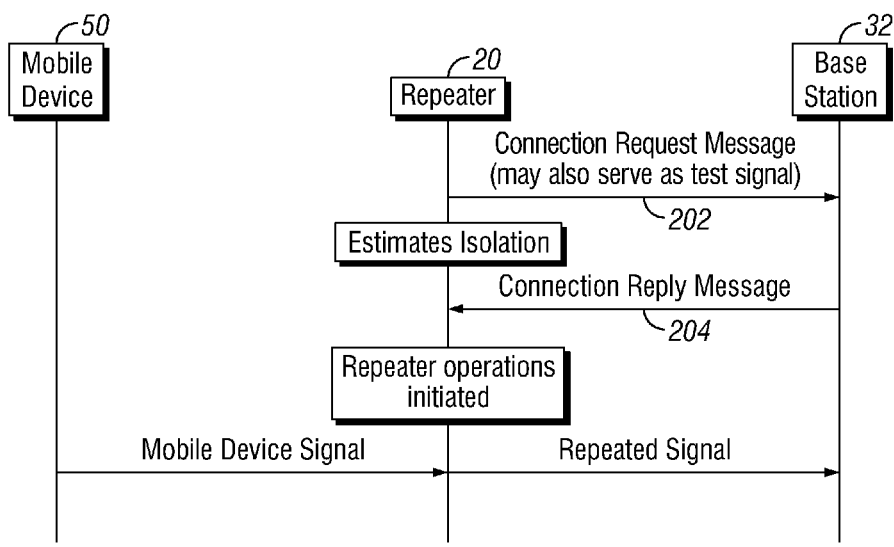

FIGS. 2A and 2B are signaling diagrams showing various examples of the interaction that may occur between the various elements in a particular embodiment of mobile communication system 10. The example signaling in FIG. 2A begins with repeater 20 connecting to access network 30. In particular embodiments, repeater 20 connects in an identical or similar manner to any of mobile devices 50 served by access network 3. For example, in the embodiment described by FIG. 2A, repeater 20 transmits a connection request message 202 (e.g., a Random Access message in certain LTE embodiments) to base station 32, requesting establishment of a radio link between repeater 20 and access network 30. In reply to connection request message 202, base station 32 transmits a connection reply message 204 to repeater 20. Connection reply message 204 indicates successful receipt of connection request message 202 by base station 32. The repeater may use the connection request message as a test signal from one antenna and correlating the signal received at the other signal with the transmitted in order to determine the isolation.

In particular embodiments, this isolation and other repeater measurements (e.g., an estimated uplink attenuation ($G_{BS}$)) are sent to an appropriate radio network node 200 of access network 30 (e.g., a radio controller 34) for processing, as shown by configuration request message 206 in FIG. 2A. In reply to the parameters and/or measurements in configuration request message 206, the relevant node provides repeater 20 with configuration information (represented by configuration reply message 208) comprising repeater max gain, and/or repeater max transmission power. The relevant network node may use one or several of the following: maximum repeater gain ($G_{max}$), maximum interference power level ($I_{ant}$), maximum roundtrip gain level ($G_{total}$), maximum interference ($I_{BS}$) to determine a suitable configuration for repeater 20, as explained above. In particular embodiments, repeater 20 may be periodically reconfigured or reconfigured in response to certain events, and as a result, the signaling of isolation and configuration information may be repeated accordingly.

Additionally, as noted above, in particular embodiments of mobile communication system 10, repeater 20 may be capable of self-configuration as in FIG. 2B. Thus, in such embodiments the signaling of isolation and configuration information may not occur. When the repeater has been configured its operations are initiated and signals received from mobile devices 50 are repeated (and possibly amplified).

Figure 3:
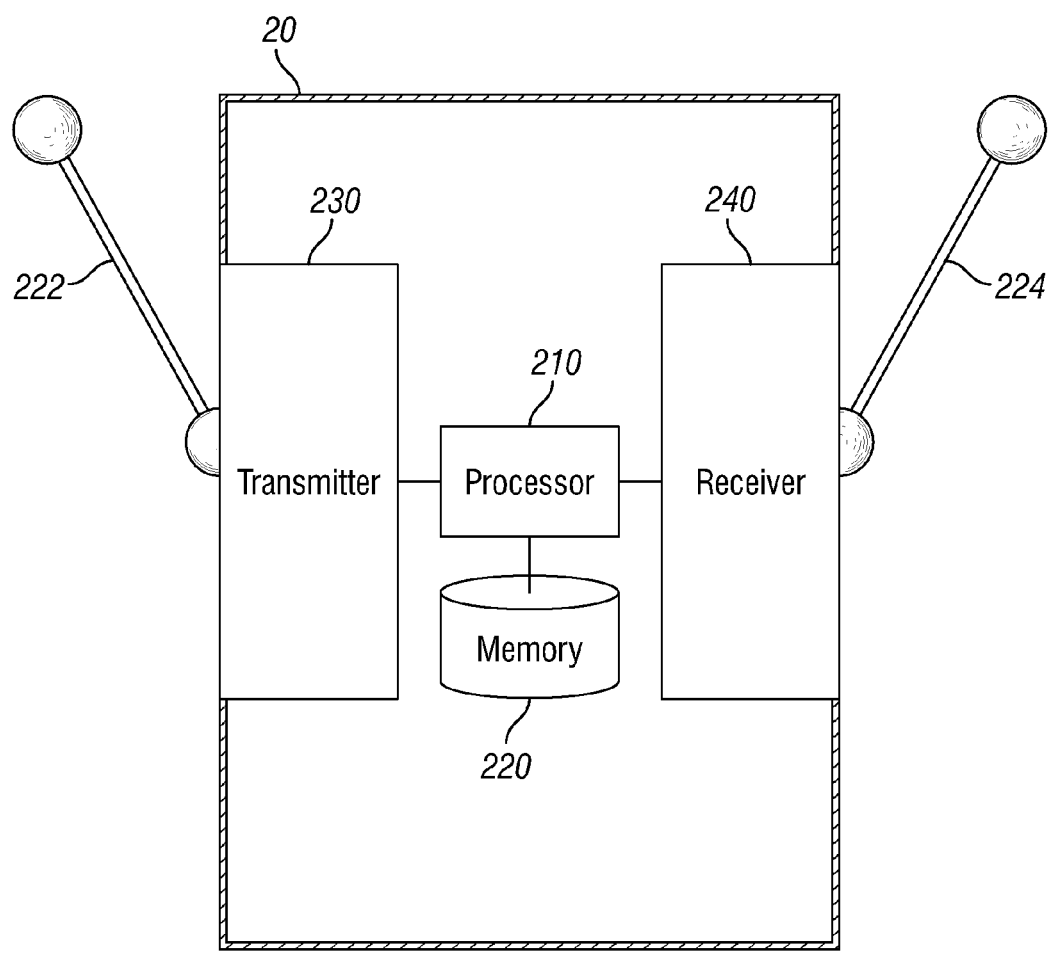
FIG. 3 is a block diagram illustrating a particular embodiment of the repeater shown in FIG. 1.

FIG. 3 is a block diagram illustrating in greater detail contents of a particular embodiment of a repeater 20. As shown in FIG. 3, the illustrated embodiment of repeater 20 includes a processor 210, a memory 220, a first antenna 222, a second antenna 224, a transmitter 230, and a receiver 240.

Processor 210 may represent or include any form of processing component, including dedicated microprocessors, general-purpose computers, or other devices capable of processing electronic information. Examples of processor 210 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of repeater 20 that includes a single processor 210, repeater 20 may include any number of processors 210 configured to interoperate in any appropriate manner.

Memory 220 stores processor instructions, power values, bit sequences for test signals 70, and/or any other data utilized by repeater 20 during operation. Memory 220 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 220 may include one or more physical components local to or remote from repeater 20.

First antenna 222 and second antenna 224 represent any suitable conductor capable of receiving and transmitting wireless signals. Transmitter 230 transmits RF signals, including test signal 70 and repeated signals that are being re-transmitted by repeater 20, over first antenna 22. Receiver 240 receives from antenna 24 certain RF signals transmitted by mobile devices 50, repeater 20, and/or other sources. Although the example embodiment in FIG. 3 includes certain numbers of antennas, receivers, and transmitters, alternative embodiments of repeater 20 may include any suitable number of these components. For example, particular embodiments of repeater 20 may have more than two antennas. Similarly, certain embodiments may include an additional receiver associated with antenna 222 and an additional transmitter associated with antenna 224, or both transmitter 230 and receiver 240 may represent transceivers.

Figure 4:
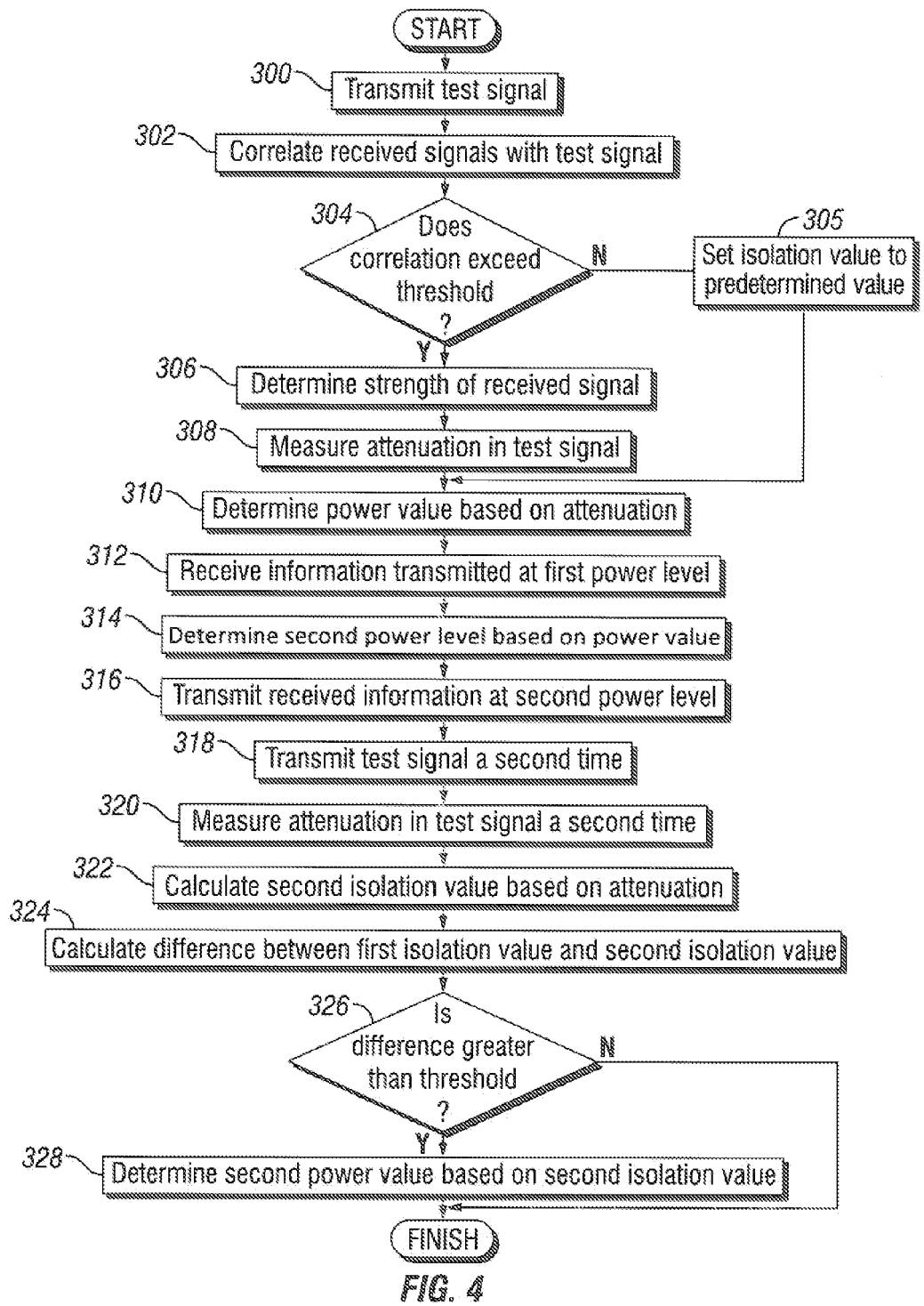
FIG. 4 is a flow chart illustrating example operation of a particular embodiment of the repeater in independently configuring a power value associated with the repeater.

FIG. 4 is a flowchart illustrating example operation of a particular embodiment of repeater 20. In particular, FIG. 4 illustrates operation of an embodiment of repeater 20 that determines for itself an appropriate power value for use by repeater 20. The steps illustrated in FIG. 4 may be combined, modified, or deleted where appropriate. Additional steps may also be added to the example operation. Furthermore, the described steps may be performed in any suitable order.

Operation begins at step 300 with repeater 20 transmitting test signal 70 from first antenna 22. Test signal 70 may represent any suitable sequence of bits. In particular embodiments, however, test signal 70 represents a signal that repeater 20 would otherwise transmit as part of its operation such as, for example, a random access signature or a scrambling code associated with the repeater.

At step 302, repeater 20 correlates signals received on second antenna 24 with the known test signal 70 transmitted by first antenna 22. At step 304, repeater 20 determines whether the correlation between the signal received at second antenna 24 and the predetermined sequence of bits in test signal 70 exceeds a minimum threshold. If so, repeater 20 decides that the signal received at second antenna 24 during the relevant period of time represents test signal 70 as received by second antenna 24 and operation will continue at step 306. If not, repeater 20 may consider the failure to detect a signal correlated with test signal 70 as an indication that first antenna 22 and second antenna 24 are sufficiently isolated. Repeater 20 may respond to this determination in any appropriate manner. For example, as shown at step 305 in FIG. 4, repeater 20 may set the isolation value to a predetermined value reflecting a suitably high isolation. In particular embodiments in which the isolation value is intended to be inversely proportional to the attenuation experienced by test signal 70, this predetermined value may be zero. In alternative embodiments, this predetermined value may represent a small non-zero value reflecting an assumption that first antenna 22 and second antenna 24 are not perfectly isolated from one another and that test signal 70 would be successfully detected at second antenna 24 if test signal 70 were transmitted over first antenna 22 with a sufficiently high power level. In the illustrated example, operation continues at step 310.

If instead repeater 20 determines (at step 304) that the signal received at second antenna 24 during the relevant period of time exceeds the minimum threshold, repeater 20 determines the strength of the received signal during that time period at step 306. At step 308, repeater 20 then measures an attenuation in the transmitted test signal 70 as received at second antenna 24. In particular embodiments, repeater 20 measures the attenuation by comparing the signal strength of the received test signal 70 with the transmission power at which test signal 70 was originally transmitted. Based on the comparison, repeater 20 may then determine an isolation value quantifying this attenuation.

At step 310, repeater 20 determines a power value for repeater 20 based on the attenuation in test signal 70 as received at second antenna 24 and/or any isolation value generated or set by repeater 20 in response to this attenuation. As discussed above, this power value indicates a power level repeater 20a should use to transmit repeated signals. The power value may indicate in any suitable manner, directly or indirectly, the power level to be used for transmitting repeated signals. For example, the power value may reflect a repeater gain ($G_R$) by which repeater 20a should amplify repeated signals, a maximum repeater gain ($G_{max}$) below which repeater 20a should set repeater gain $G_R$, a transmission power ($P_{tx}$) that repeater 20a should use when transmitting repeated signals, or any other parameter that affects the power level at which repeater 20 transmits repeated signals.

After repeater 20 has determined the relevant power value, repeater 20 uses the determined power value to establish an appropriate transmission power to use in repeating information received from mobile devices 50 and/or base stations 32. This process is illustrated in FIG. 4 by steps 312-316. More specifically, at step 312, repeater 20 receives information, on second antenna 24, transmitted at a first power level by either a mobile device 50 or a base station 32. At step 314; repeater 20 determines, based at least in part on the power value, a second power level at which to transmit the received information. Repeater 20 then transmits the received information over second antenna 24 at the second power level at step 316.

As noted above, repeater 20 may update the determined power value at appropriate times during its operation. An example of this process is shown in FIG. 4 by steps 318-328. Repeater 20 transmits test signal 70 a second time over first antenna 22 at step 318. At step 320, repeater 20 then measures a second time the attenuation in test signal 70 as received at second antenna 24. At step 322, repeater 20 calculates a second isolation value based on the attenuation Repeater 20 then determines whether the power value previously determined should be updated. In the illustrated embodiment, repeater 20 makes this determination by calculating a difference between the first isolation value and the second isolation value at step 324. At step 326, repeater 20 determines whether the difference between the first isolation value and the second isolation value is greater than a threshold. In response to determining that the difference is greater than the threshold, repeater 20 determines a second power value based on the second isolation value at step 328. Operation of the described embodiment of repeater 20 may then continue indefinitely or terminate as shown in FIG. 4.

Figure 5A:
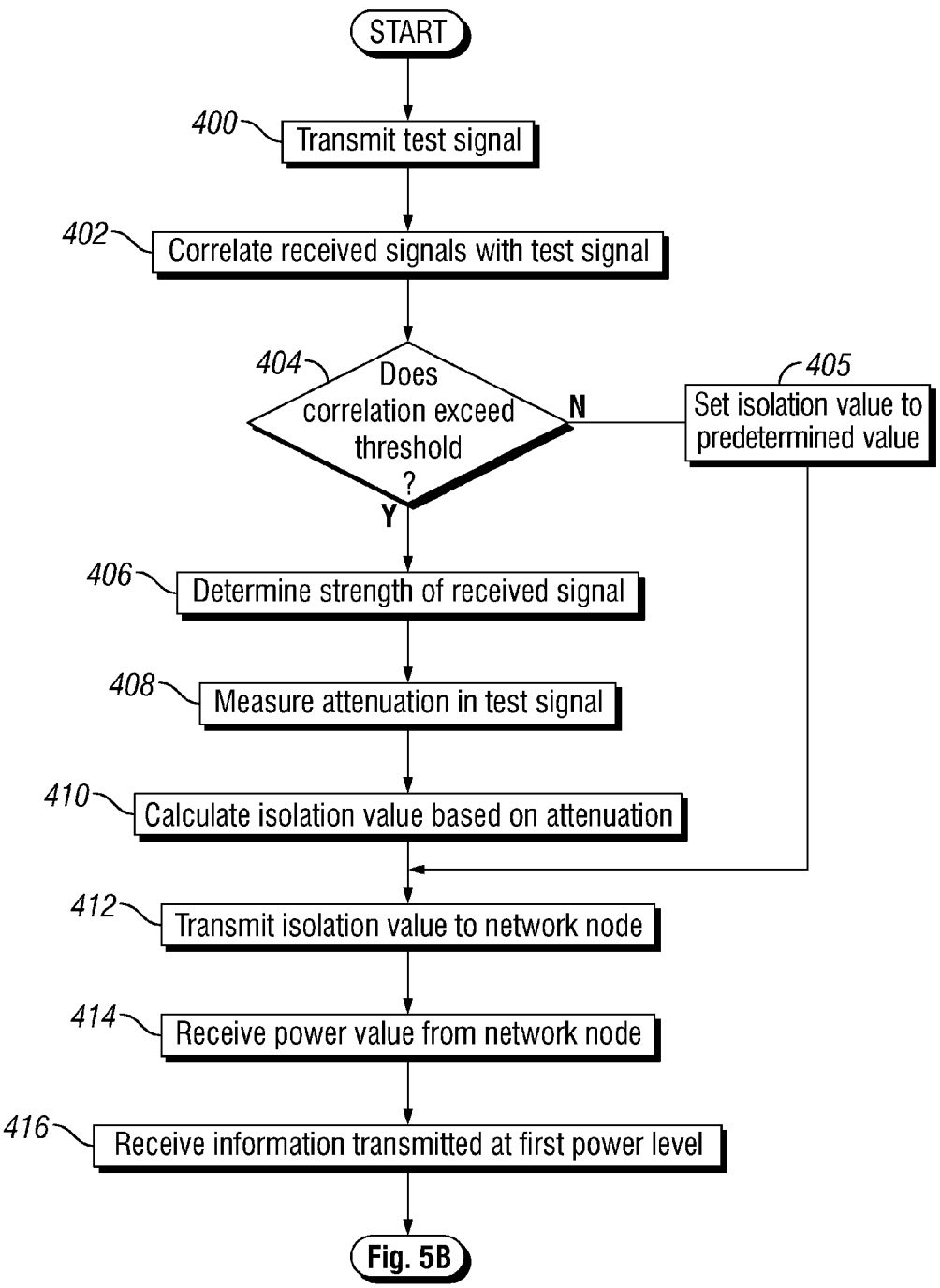
FIGS. 5A and 5B are a flow chart illustrating example operation of an alternative embodiment of the repeater in configuring a power value associated with the repeater based on input from another node of a mobile communication network.
Figure 5B:
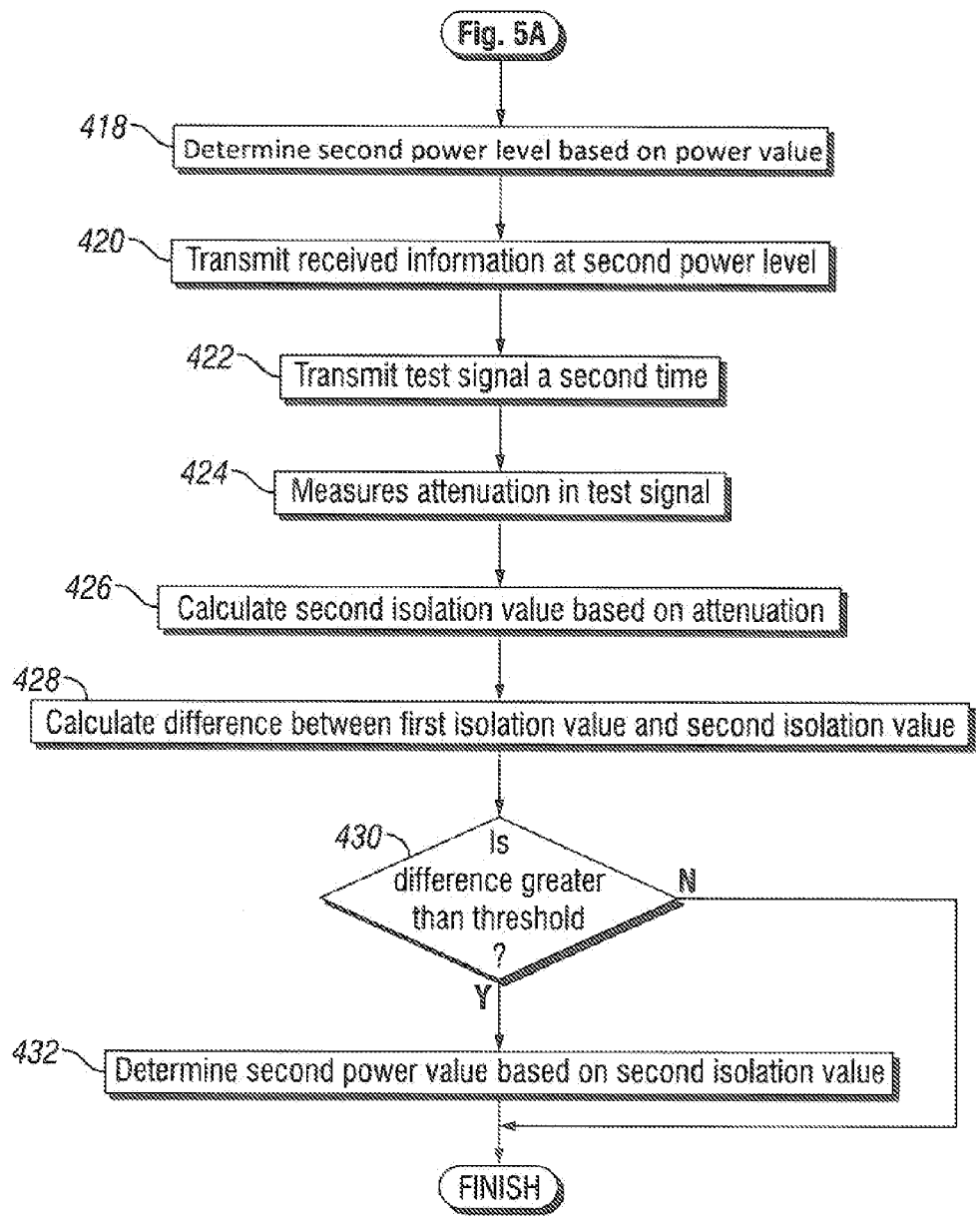

FIGS. 5A and 5B are a flowchart illustrating example operation of another embodiment of repeater 20. In particular, FIGS. 5A and 5B illustrate operation of an embodiment of repeater 20 that determines an appropriate power value for use by repeater 20 by communicating the isolation value to other components of mobile communication system 10 and receiving input on the appropriate power value in response to the communicated isolation value. The steps illustrated in FIGS. 5A and 5B may be combined, modified, or deleted where appropriate. Additional steps may also be added to the example operation. Furthermore, the described steps may be performed in any suitable order.

Operation begins at step 400 with repeater 20 transmitting test signal 70 from first antenna 22. Operation continues in a similar fashion to that described above in regards to FIG. 4, with similarly-captioned steps being performed in a similar manner to that described above for the corresponding step in FIG. 4. After measuring the attenuation in the received test signal 70, however, repeater 20 calculates an isolation value based on the attenuation at step 410. Repeater 20 then transmits the calculated or set isolation value to an appropriate node of access network 30 (such as one of base stations 32 or one of radio controllers 34) at step 412. The network node that receives the isolation value then determines an appropriate power value for repeater 20 based on the received isolation value. After determining the appropriate power value, the relevant node transmits the power value to repeater 20.

Thus, at step 414, repeater 20 receives the power value from the relevant element of mobile communication system 10. Repeater 20 then begins using the received power value in a similar manner to that described above with respect to FIG. 4 as shown by steps 416-420. The example embodiment of FIGS. 5A-5B also supports updating the power value in response to changes in the isolation associated with antennas 22 and 24 of repeater 20. As shown by steps 422-432, repeater 20 determines a second power value by again transmitting an isolation value to the relevant element of mobile communication system 10.

Figure 6A:
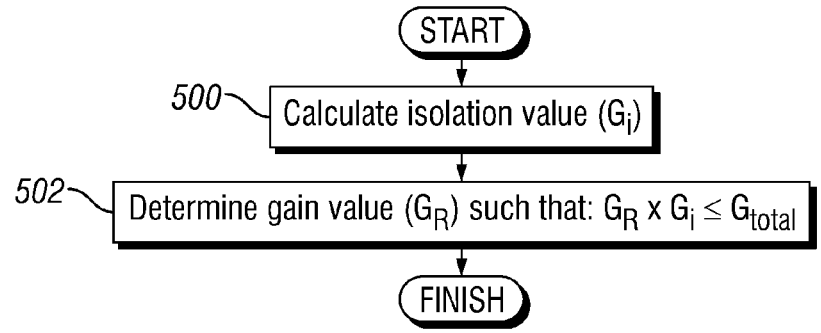
FIGS. 6A-6C illustrate example algorithms for determining a power value for use by the repeater.
Figure 6B:
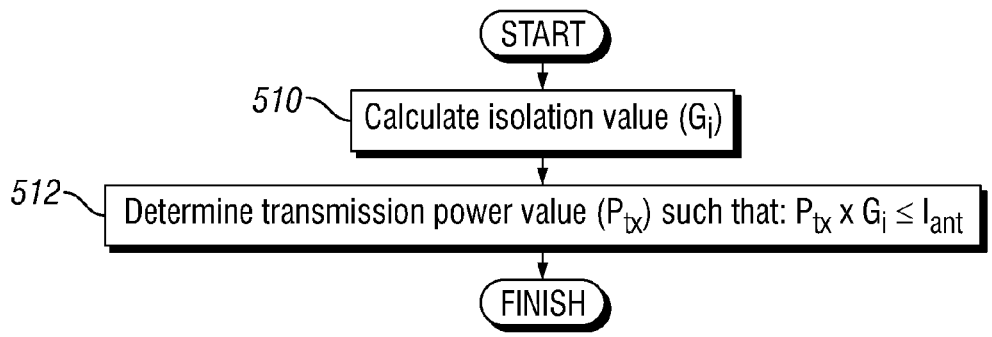
Figure 6C:
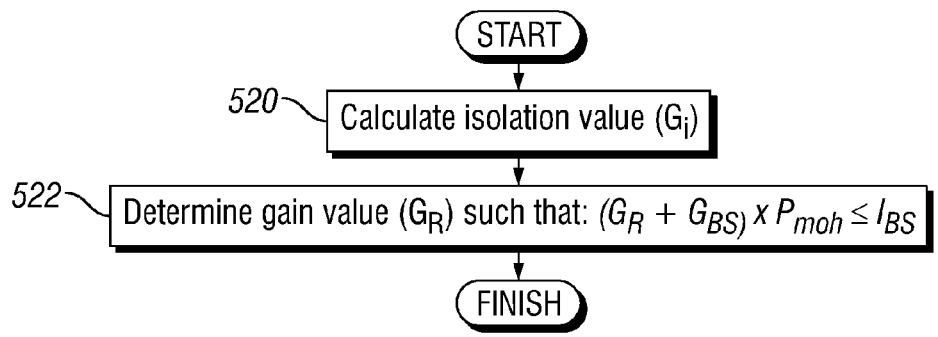

FIGS. 6A-6C illustrate in greater detail various examples of how repeater 20 (e.g., in step 310 of FIG. 4) or another element of mobile communication system 10 could determine a power level for repeater 20. Although FIG. 6A-6C illustrate specific examples of how this determination may be made in particular embodiments of mobile communication system 10, the power value may be determined based on the attenuation in any appropriate manner as discussed above.

FIG. 6A illustrates an example in which the determined power value represents a gain value indicating an amount of amplification to be applied by repeater 20 (e.g., a fixed gain level to be used by repeater 20 or a maximum gain level that repeater 20 cannot exceed) to signals received by repeater 20 on second antenna 24 and re-transmitted over first antenna 22. In FIG. 6A, after repeater 20 measures the attenuation experienced between antennas 22 and 24, repeater 20 calculates an isolation value for repeater 20 that is proportional to the measured attenuation at step 500. Then, at step 502, repeater 20 (or another component of mobile communication system 10 responsible for determining the power value) determines a gain value such that the product of the gain value and the isolation value is less than a predetermined maximum for the roundtrip gain induced by repeater 20. That is, repeater 20 may determine the gain value ($G_R$) such that:

$$G_R \times G_i \leq G_{total},$$

where $G_i$ is an isolation value reflecting the attenuation experienced by signals transmitted between antennas 22 and 24, and $G_{total}$ is the predetermined maximum for the product of the two. Thus, in the illustrated embodiment of FIG. 6A, $G_R$ is set so that $G_R \leq G_{total}/G_i$.

FIG. 6B illustrates an example in which the determined power value represents a transmission power value indicating an amount of power that can be used by repeater 20 (e.g., a fixed power level to be used by repeater 20 or a maximum power level that repeater 20 cannot exceed) in re-transmitting signals received on second antenna 24. In FIG. 6B, after repeater 20 measures the attenuation experienced between antennas 22 and 24, repeater 20 calculates an isolation value for repeater 20 that is proportional to the measured attenuation at step 510. Then, at step 512, repeater 20 (or another component of mobile communication system 10 responsible for determining the power value) determines a transmission power value such that the product of the transmission power value and the isolation value results in less than a predetermined maximum level of interference at second antenna 24 resulting from re-transmissions by first antenna 22. That is repeater 20 may determine the transmission power value ($P_{tx}$) such that:

$$P_{tx} \times G_i \leq I_{ant},$$

where Gi is again an isolation value reflecting the attenuation experienced by signals transmitted between antennas 22 and 24, and $I_{ant}$ is a maximum interference value representing the maximum allowable contribution, by first antenna 22, to the interference power received at second antenna 24. Thus, in the illustrated embodiment of FIG. 6B, $P_{tx}$ is set so that $P_{tx} \leq I_{ant}/G_i$.

FIG. 6C illustrates an example in which the determined power value again represents a gain value indicating an amount of amplification to be applied by repeater 20 (e.g., a fixed gain level to be used by repeater 20 or a maximum gain level that repeater 20 cannot exceed) to signals received by repeater 20 on second antenna 24 and re-transmitted over first antenna 22. In FIG. 6C, after repeater 20 measures the attenuation experienced between antennas 22 and 24, repeater 20 calculates an isolation value for repeater 20 that is proportional to the measured attenuation at step 520. Then, at step 522, repeater 20 (or another component of mobile communication system 10 responsible for determining the power value) determines a gain value such that the amount of interference experienced at the serving base station 32 due to signals transmitted by mobile devices 50 and re-transmitted by repeater 20 is less than a predetermined maximum base station interference level. That is, repeater 20 may determine the gain value ($G_R$) such that:

$$(G_R+G_{BS}) \times P_{mob} \leq I_{BS}.$$

where $G_i$ is again an isolation value reflecting the attenuation experienced by signals transmitted between antennas 22 and 24, $G_{BS}$ is an uplink attenuation value reflecting the amount of attenuation experienced by signals transmitted to the serving base station 32 over first antenna 22, $P_{mob}$ is a mobile terminal power value reflecting the amount of power used by mobile devices 50 in transmitting signals to repeater 20, and $I_{BS}$ is a maximum base-station interference value representing the maximum allowable contribution, by repeater 20, to the interference power received at the serving base station 32. Thus, in the illustrated embodiment of FIG. 6B, $G_R$ is set so that $G_R \leq (I_{BS}/P_{mob}) - G_{BS}$.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for operating a repeater in a wireless communication network, comprising
    transmitting a predetermined sequence of bits over a first antenna of a repeater;
    measuring an attenuation in the transmitted bits as received at a second antenna of the repeater;
    determining a power value for the repeater based on the attenuation, wherein determining the power value for the repeater comprises:
        calculating an isolation value for the repeater based on the attenuation;
        transmitting the isolation value to a radio network node, and
        receiving the power value from the radio network node;
    receiving information at a first power level from one of a mobile terminal and a base station;
    determining, based at least in part on the power value, a second power level at which to transmit the received information; and
    transmitting the received information at the second power level.

2. The method of claim 1, wherein the isolation value comprises a first isolation value and further comprising:
    transmitting the sequence of bits a second time over the first antenna;
    measuring a second time an attenuation in the transmitted bits as received at the second antenna;
    calculating a second isolation value based on the attenuation;
    calculating a difference between the first isolation value and the second isolation value; and
    in response to determining that the difference is greater than a threshold, transmitting the second isolation value to the base station.

3. The method of claim 1, wherein the sequence of bits comprises a portion of an uplink communication transmitted by the repeater to the base station.

4. The method of claim 1, wherein the sequence of bits comprises a random access signature associated with the repeater.

5. The method of claim 1, wherein the sequence of bits comprises a scrambling code associated with the repeater.

6. An apparatus for repeating signals in a wireless communication network, comprising
    a first antenna;
    a transmitter operable to transmit signals on the first antenna;
    a second antenna;
    a receiver operable to receive signals through the second antenna; and
    a processor operable to:
        transmit a sequence of bits over the first antenna using the transmitter;
        measure an attenuation in the transmitted bits as received at the second antenna;
        determine a power value based on the attenuation, wherein the processor is operable to determine the power value by:
            calculating an isolation value based on the attenuation;
            transmitting the isolation value to a base station using the transmitter, and
            receiving the power value from the base station;
        receive information at a first power level from one of a mobile terminal and a base station;
        determine, based at least in part on the power value, a second power level at which to transmit the received information; and
        transmit the received information at the second power level.

7. The apparatus of claim 6, wherein the isolation value comprises a first isolation value and further wherein the processor is further operable to:
    transmit the sequence of bits a second time over the first antenna;
    measure a second time an attenuation in the transmitted bits as received at the second antenna;
    calculate a second isolation value based on the attenuation;
    calculate a difference between the first isolation value and the second isolation value; and
    in response to determining that the difference is greater than a threshold, transmit the second isolation value to the base station.

8. The apparatus of claim 6, wherein the sequence of bits comprises a portion of an uplink communication transmitted by the apparatus to the base station.

9. The apparatus of claim 6, wherein the sequence of bits comprises a random access signature associated with the apparatus.

10. The apparatus of claim 6, wherein the sequence of bits comprises a scrambling code associated with the apparatus.

11. A method for operating a repeater in a wireless communication network, comprising
    transmitting a predetermined sequence of bits over a first antenna of a repeater;
    measuring an attenuation in the transmitted bits as received at a second antenna of the repeater;

determining a power value for the repeater based on the attenuation, wherein determining the power value for the repeater comprises determining a gain level for the repeater, by calculating an isolation value for the repeater that is proportional to the attenuation and determining the gain level such that a product of the gain level and the isolation value is less than a predetermined maximum;

receiving information at a first power level from one of a mobile terminal and a base station;

determining, based at least in part on the power value, a second power level at which to transmit the received information; and transmitting the received information at the second power level.

12. A method for operating a repeater in a wireless communication network, comprising transmitting a predetermined sequence of bits over a first antenna of a repeater;

measuring an attenuation in the transmitted bits as received at a second antenna of the repeater;

determining a power value for the repeater based on the attenuation, wherein determining the power value for the repeater comprises determining a maximum transmission power level for the first antenna, by calculating an isolation value for the repeater that is proportional to the attenuation and determining the maximum transmission power level for the first antenna based on the isolation value and a maximum interference level associated with the second antenna;

receiving information at a first power level from one of a mobile terminal and a base station;

determining, based at least in part on the power value, a second power level at which to transmit the received information; and transmitting the received information at the second power level.

13. An apparatus for repeating signals in a wireless communication network, comprising a first antenna;

a transmitter operable to transmit signals on the first antenna;

a second antenna;

a receiver operable to receive signals through the second antenna; and a processor operable to:

transmit a sequence of bits over the first antenna using the transmitter;

measure an attenuation in the transmitted bits as received at the second antenna;

determine a power value based on the attenuation, wherein the processor is operable to determine the power value by determining a maximum gain for the transmitter, by calculating an isolation value that is proportional to the attenuation determining the maximum gain such that the product of the maximum gain and the isolation value is less than a predetermined maximum;

receive information at a first power level from one of a mobile terminal and a base station;

determine, based at least in part on the power value, a second power level at which to transmit the received information; and transmit the received information at the second power level.

14. An apparatus for repeating signals in a wireless communication network, comprising a first antenna;

a transmitter operable to transmit signals on the first antenna;

a second antenna;

a receiver operable to receive signals through the second antenna; and a processor operable to:

transmit a sequence of bits over the first antenna using the transmitter;

measure an attenuation in the transmitted bits as received at the second antenna;

determine a power value based on the attenuation, wherein the processor is operable to determine the power value by determining a maximum transmission power level for the transmitter, by calculating an isolation value that is proportional to the attenuation and determining the maximum transmission power level for the transmitter based on the isolation value and a maximum interference level associated with the receiver;

receive information at a first power level from one of a mobile terminal and a base station;

determine, based at least in part on the power value, a second power level at which to transmit the received information; and transmit the received information at the second power level.

* * * * *

UNITED STATES PATENT AND TRADEMARK OFFICE
CERTIFICATE OF CORRECTION

PATENT NO. : 8,787,824 B2  
APPLICATION NO. : 13/238597  
DATED : July 22, 2014  
INVENTOR(S) : Gunnarsson Page 1 of 1

It is certified that error appears in the above-identified patent and that said Letters Patent is hereby corrected as shown below:

On the title page, in item (56), under "OTHER PUBLICATIONS", in Column 2, Line 5, delete "(EPS)," and insert -- (EPS): --, therefor.

On the title page, in item (56), under "OTHER PUBLICATIONS", in Column 2, Line 9, delete "Specificaition" and insert -- Specification --, therefor.

On the title page, in item (56), under "OTHER PUBLICATIONS", in Column 2, Line 9, delete "25.231" and insert -- 25.331 --, therefor.

In the Specification

In Column 11, Line 8, delete "step 314;" and insert -- step 314, --, therefor.

In Column 13, Line 14, delete "$(G_R+G_{BS}) \times P_{mob} \leq I_{BS}.$" and insert -- $(G_R+G_{BS}) \times P_{mob} \leq I_{BS},$ --, therefor.

Signed and Sealed this  
Twenty-sixth Day of May, 2015

Michelle K. Lee  
*Director of the United States Patent and Trademark Office*